(12) United States Patent
Chabaille et al.

(10) Patent No.: US 9,857,080 B2
(45) Date of Patent: Jan. 2, 2018

(54) FUEL INJECTOR FOR A TURBINE ENGINE

(71) Applicant: SNECMA, Paris (FR)

(72) Inventors: Christophe Chabaille, Paris (FR); Sebastien Christophe Loval, Bussy Saint Georges (FR)

(73) Assignee: SNECMA, Paris (FR)

( * ) Notice: Subject to any disclaimer, the term of this patent is extended or adjusted under 35 U.S.C. 154(b) by 450 days.

(21) Appl. No.: 14/506,914

(22) Filed: Oct. 6, 2014

(65) Prior Publication Data

US 2015/0096301 A1 Apr. 9, 2015

(30) Foreign Application Priority Data

Oct. 8, 2013 (FR) ..................... 13 59730

(51) Int. Cl.
*F23R 3/28* (2006.01)
*F02C 7/232* (2006.01)
*F23K 5/14* (2006.01)

(52) U.S. Cl.
CPC ............... *F23R 3/28* (2013.01); *F02C 7/232* (2013.01); *F23K 5/147* (2013.01)

(58) Field of Classification Search
CPC .... F02C 7/232; F02C 9/263; Y10T 137/2663; Y10T 137/7846
See application file for complete search history.

(56) References Cited

U.S. PATENT DOCUMENTS

| | | | |
|---|---|---|---|
| 4,938,418 A * | 7/1990 | Halvorsen ............... | F02C 9/263 239/390 |
| 5,732,730 A | 3/1998 | Shoemaker et al. | |
| 5,918,628 A * | 7/1999 | Harding .................. | F02C 7/232 137/497 |
| 8,636,263 B2 * | 1/2014 | Deaton ................. | F16K 17/044 251/337 |
| 2003/0093998 A1 * | 5/2003 | Michau .................. | F23K 5/147 60/740 |

(Continued)

FOREIGN PATENT DOCUMENTS

FR 2 832 457 A1 5/2003
FR 2 832 492 A1 5/2003

OTHER PUBLICATIONS

French Preliminary Search Report dated Jan. 14, 2014, in French Application No. 13 59730 filed Oct. 8, 2013 (with English Translation of Categories of Cited Documents).

*Primary Examiner* — Pascal M Bui Pho
*Assistant Examiner* — Edwin Kang
(74) *Attorney, Agent, or Firm* — Oblon, McClelland, Maier & Neustadt, L.L.P.

(57) ABSTRACT

A fuel injector for a turbine engine is provided. The fuel injector includes a body including an admissions chamber for admitting fuel under pressure, a stop valve mounted in the body downstream from the admission chamber and designed to open at a first determined fuel pressure and to remain open beyond that first pressure in order to feed a primary fuel circuit, and a metering valve mounted in the body downstream from the stop valve and designed to open above a second determined fuel pressure, greater than the first pressure, and to remain open above the second pressure in order to feed a secondary fuel circuit. The stop valve and the metering valve form a common movable assembly.

4 Claims, 2 Drawing Sheets

(56) References Cited

U.S. PATENT DOCUMENTS

| | | | |
|---|---|---|---|
| 2003/0094203 A1* | 5/2003 | D'Agostino | F23K 5/147 137/512.1 |
| 2009/0173810 A1* | 7/2009 | Rodrigues | F02C 7/232 239/533.3 |
| 2010/0037615 A1* | 2/2010 | Williams | F16K 15/186 60/741 |

* cited by examiner

FUEL INJECTOR FOR A TURBINE ENGINE

BACKGROUND OF THE INVENTION

Field of the Invention

The present invention relates to a fuel injector for a turbine engine such as an airplane turboprop or turbojet.

Description of the Related Art

A turbine engine conventionally comprises an annular combustion chamber including regularly distributed fuel injectors at its upstream end, together with means for feeding air around the injectors.

There are two main types of injector, namely so-called "aeromechanical" injectors having two fuel circuits providing fuel flow rates that correspond to different operating stages of the engine (an ignition stage, a stage of operating at low power, and a stage of operating at full power), and so-called "aerodynamic" injectors that have only a single fuel circuit for all stages of operation of the engine.

Patent application FR 2 832 492 in the name of the Applicant describes an aeromechanical type injector having a primary fuel circuit serving for example during an ignition stage and a low power stage, and a secondary circuit that becomes involved during subsequent stages of operation at medium to full power, in addition to the primary circuit.

That type of injector comprises a body including admission means for admitting fuel under pressure, a stop valve mounted in the body downstream from the admission means and designed to open at a first determined fuel pressure P1 and to remain open beyond that first pressure in order to feed a primary fuel circuit, and a metering valve mounted in the body downstream from the stop valve and designed to open above a second determined fuel pressure P2, greater than the first pressure, and to remain open above the second pressure in order to feed a secondary fuel circuit.

The flow rate of fuel in the secondary circuit is adjusted by means of metering slots formed in the metering valve and presenting flow sections that vary as a function of the position of the valve, i.e. as a function of the fuel feed pressure. The greater the pressure of the fuel, the greater the flow sections of the slots.

In operation, several situations can arise.

In a first situation, the fuel pressure upstream from the stop valve is less than P1. The stop valve is then held in the closed position, e.g. by a return spring, and fuel flows neither in the primary circuit nor in the secondary circuit.

In a second situation, corresponding to a stage of ignition or of operation at low speed, the pressure of the fuel upstream from the stop valve is greater than P1 but the pressure of the fuel upstream from the metering valve is less than P2. The stop valve is then open and fuel can flow in the primary circuit. The metering valve nevertheless remains closed and fuel does not flow in the secondary circuit.

In a third situation, corresponding to a stage of operation at medium or full speed, the pressure of the fuel upstream from the stop valve is greater than P1 and the pressure of the fuel upstream from the metering valve is greater than P2. In this situation, the stop valve is open and fuel can flow in the primary circuit. The metering valve is also open and fuel can flow in the secondary circuit.

Such an injector requires two distinct valves to be used, which valves are movable independently of each other. Each valve is subjected to the action of a distinct return spring housed in a portion of the body. That injector presents considerable size and is heavy. It is also appropriate to improve the lifetime of such an injector.

Furthermore, studying the characteristic curve of the injector, i.e. the curve plotting fuel flow rate as a function of the pressure difference across the injector, reveals hysteresis in operation. This raises a problem of adjusting the injector and of ensuring that its behavior is predictable in operation.

Given the large number of parts in such an injector, this is also associated with the injector being subject to a certain amount of drift, i.e. to the characteristic curve of the injector changing over time. This drift is due in particular to its various parts being subject to wear.

BRIEF SUMMARY OF THE INVENTION

A particular object of the invention is to provide a solution to these problems that is simple, effective, and inexpensive.

To this end, the invention provides a fuel injector for a turbine engine such as an airplane turboprop or turbojet, the injector comprising a body including admission means for admitting fuel under pressure, a stop valve mounted in the body downstream from the admission means and designed to open at a first determined fuel pressure and to remain open beyond that first pressure in order to feed a primary fuel circuit, and a metering valve mounted in the body downstream from the stop valve and designed to open above a second determined fuel pressure, greater than the first pressure, and to remain open above the second pressure in order to feed a secondary fuel circuit, the injector being characterized in that the stop valve and the metering valve form a common movable assembly.

In this way, the stop and metering valves are movable together and not independently of each other, thereby limiting complexity and avoiding the above-mentioned problems of hysteresis. The assembly can be urged towards the closed positions of said valves by a single return member, thereby significantly limiting the weight and the size of the injector. Given the smaller number of parts that are separate and movable independently of one another, the lifetime of such an injector is also improved.

The movable assembly may be formed as a single piece or as a plurality of parts that are assembled together so as to move together in a manner in which they are not independent of one another.

Thus, according to a characteristic of the invention, said movable assembly may be urged towards a closed position of the stop valve and of the metering valve by means of a single resilient return member, e.g. such as a helical compression spring.

Furthermore, the stop valve may be designed, in a closed position of said stop valve, to bear against a seat of the body, which seat is fitted with an O-ring.

This makes it possible to provide very good sealing for the stop valve, i.e. to ensure a leakage rate that is very small or even zero.

Advantageously, the stop valve is formed by a first end of the movable assembly, the metering valve being formed by a second end of the movable assembly.

Under such circumstances, the body may include an inner tubular portion in which the movable assembly is slidably mounted, the outer surface of the movable assembly including at least one slot having both a first end opening out into an inner chamber of the body situated downstream from the stop valve and in fluid flow connection with the primary fuel circuit, and also a second end of varying section, the second end of the slot being spaced apart from the second end of the movable assembly by a sealing section of the movable assembly, which sealing section co-operates with a complementary sealing section of the tubular portion so as to form the metering valve.

The lengths of the sealing sections of the tubular portion and of the movable assembly are designed so as to enable the stop valve to be opened by the movable assembly moving through a first stroke while keeping the metering valve closed, and then to enable the metering valve to be opened over a consecutive second stroke. The metering valve becomes open when the above-mentioned slot opens out beyond the sealing section of the tubular portion, e.g. into a chamber situated downstream therefrom and in fluid flow connection with the secondary fuel circuit.

According to another characteristic of the invention, the inner chamber of the body is defined between the tubular portion and an annular wall of the body located radially outside said tubular portion, the resilient member being housed at least in part in said inner chamber and bearing at a first end against a portion of the movable assembly, and at a second end against a bottom of said inner chamber.

Under such circumstances, a leakage channel may be formed in the body and opens out at a first end in the sealing section of the tubular portion, and at a second end in the primary fuel circuit.

Given the structure of the metering valve, obtained by the complementary shapes of the sealing sections of the tubular portion and of the movable assembly, laminar leaks of fuel exist that occur between the complementary surfaces of the above-mentioned sections when the metering valve is closed. These leaks feed the secondary fuel circuit.

The above-mentioned leakage channel serves to reinject all or some of this laminar leakage flow into the primary fuel circuit. In practice, it has been calculated that at least 50% of the laminar leaks can thus be reinjected into the primary circuit. This is made possible in particular by the pressure difference that exists between the primary circuit and the secondary circuit. In order to increase this pressure difference, i.e. in order to reduce the pressure in the primary circuit, a diaphragm may be provided in the primary circuit, upstream from the opening of the above-mentioned leakage channel.

In addition, the movable assembly may include an abutment suitable for bearing against the inner tubular portion of the body when the stop valve and the metering valve are open.

The invention also provides a turbine engine, such as an airplane turboprop or turbojet that includes at least one injector of the above-specified type.

BRIEF DESCRIPTION OF THE SEVERAL
VIEWS OF THE DRAWINGS

The invention can be better understood and other details, characteristics, and advantages of the invention appear on reading the following description made by way of non-limiting example and with reference to the accompanying drawings, in which.

DETAILED DESCRIPTION OF THE
INVENTION

Figure 1:
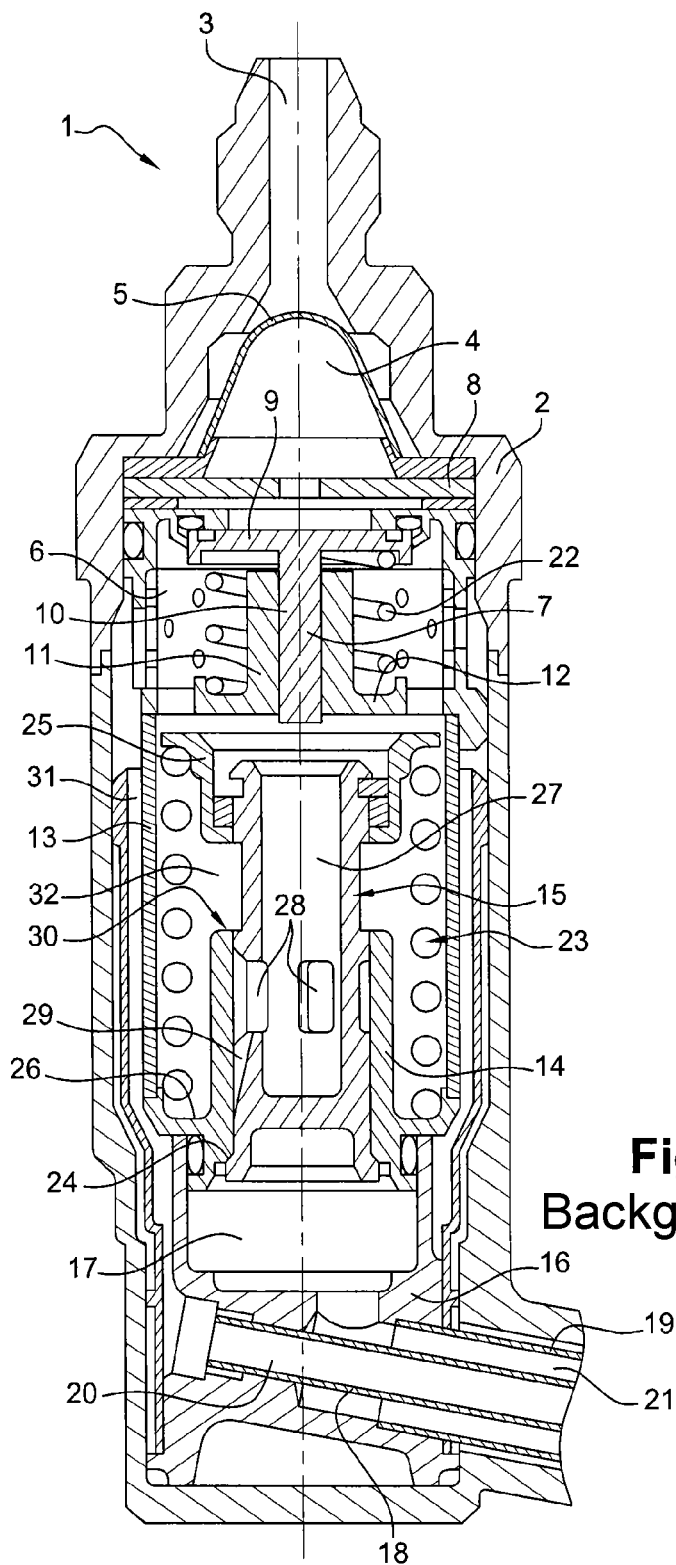
FIG. 1 is a longitudinal section view of a prior art fuel injector.

A fuel injector 1 as disclosed in patent application FR 2 832 492 in the name of the Applicant is shown in FIG. 1.

This injector 1 is of the aeromechanical type and it comprises a primary fuel circuit e.g. for use during a starting stage and at low power, and a secondary circuit that becomes involved during subsequent stages of operation, at medium to high power, in addition to the primary circuit.

The injector 1 comprises a hollow body 2 with a fuel admission orifice 3 for receiving fuel under pressure coming from a fuel pump (not shown) and leading into a pre-admission chamber 4 after passing through a filter strainer 5.

The body 2 also has an admission chamber 6 situated downstream (in the flow direction of fuel through the injector) from the pre-admission chamber 4 and separated therefrom by a stop valve 7. A diaphragm 8 is placed between the pre-admission chamber 4 and the stop valve 7.

The stop valve 7 has a head 9 and a stem 10 movably mounted in a tubular portion 11 of an annular support 12 that is stationary relative to the body 2. The annular support 12 rests on a tubular bushing 13 extending downwards and itself resting on another tubular support 14 having a metering valve 15 mounted therein. The support 14 finally rests on a part 16 that defines a reception chamber 17 situated under the metering valve 15 and serving to support two coaxial tubes 18 and 19.

The inner tube 18 forms a duct 20 for passing a primary fuel flow, with the annular space between the two tubes 18 and 19 forming a duct 21 for passing a secondary fuel flow.

An annular space 31 forming part of the primary circuit is defined between the outer wall of the bushing 13 and the body 2. The inner wall of the bushing 13 also defines an inner chamber 32 situated upstream from the metering valve 15.

The stop valve 7 is held in the closed position by a return spring 22, with the stop valve 7 being opened when the pressure of the fuel upstream from the valve exceeds a first predetermined value P1.

The metering valve 15 is also held in the closed position by a return spring 23, with the metering valve 15 being opened when the pressure of fuel upstream from the valve 15 exceeds a second predetermined value P2, greater than the above-mentioned first value P1.

The metering valve 15 has a bottom end forming a head for resting on a seat 24 of the corresponding support, and a top end where a cup 25 is fastened. The return spring bears firstly against the cup 25 and secondly against a radial surface 26 on the support 14.

The metering valve 15 includes a central axial hole 27 and radial openings 28 opening out into the central hole 27 and into metering slots 29 of appropriate shapes that are formed in the outer surface of the metering valve 15.

The metering valve 15 is movable between two extreme positions, respectively a completely closed position in which its head rests against the seat 24 of the support 14 under the action of the corresponding return spring 23, and a completely open position in which the cup 25 comes into abutment against the top end 30 of the tubular support 14.

In the completely closed position of the metering valve 15, as shown in FIG. 1, the openings 28 and the slots 29 are situated facing the tubular support 14, the bottom ends of the slots 29 not opening out into the reception chamber 17. As a result, in this position, the fuel present in the chamber 32 cannot flow into the reception chamber 17 and into the secondary duct 21.

When the pressure of the fuel situated in the chamber 32 increases, then this pressure causes the metering valve 15 to move towards its open position, i.e. downwards, against the force exerted by the return spring 23.

When this pressure exceeds the second valve P2, the slots 29 open out into the reception chamber 17 and fuel can flow into the secondary duct 21.

The shapes of the slots 29 are such that the flow sections of the slots 29 vary as a function of the position of the metering valve 15. In particular, the higher the pressure of the fuel in the chamber 27, the greater the flow sections of the slots 29.

In operation, several situations can arise.

In a first situation, the pressure of the fuel in the pre-admission chamber 4 is less than P1. The stop valve 7 is then held in its closed position by the return spring 22 and fuel flows neither into the primary circuit 20 nor into the secondary circuit 21.

In a second situation, corresponding to a stage of ignition or of operating at low speed, the pressure of the fuel in the pre-admission chamber 4 is greater than P1, but the pressure of the fuel in the chamber 32 is less than P2. The stop valve 7 is then open and fuel can flow into the annular space 31 and then into the primary duct 20 (primary circuit). The metering valve 15 nevertheless remains closed, and fuel does not flow in the secondary duct 21.

In a third situation, corresponding to a stage of operating at medium or full speed, the pressure of the fuel in the pre-admission chamber 4 is greater than P1 and the pressure of the fuel in the chamber 32 is greater than P2. The stop valve 7 is open and fuel can flow into the annular space 31 and then into the primary duct 20 (primary circuit). In addition, the metering valve 15 is also open and fluid can flow through the chamber 32, the openings 28, the slots 29, the reception chamber 17, and then the secondary duct 21 (secondary circuit).

As mentioned above, such an injector is of considerable size and weight. It is also appropriate to improve the lifetime of such an injector. Furthermore, studying the characteristic curve of such an injector reveals the presence of hysteresis in operation. This is in addition to the injector being the subject of a certain amount of drift over time.

Figure 2:
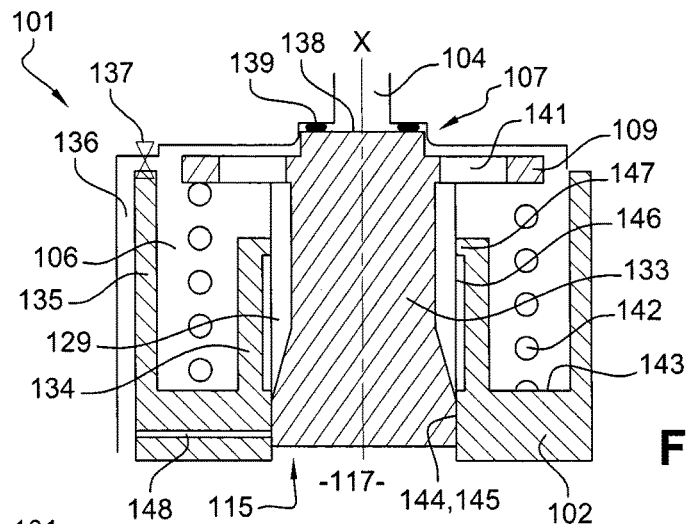
FIGS. 2 to 4 are longitudinal section views of a portion of an injector in an embodiment of the invention, shown in three different positions of the movable assembly.
Figure 3:
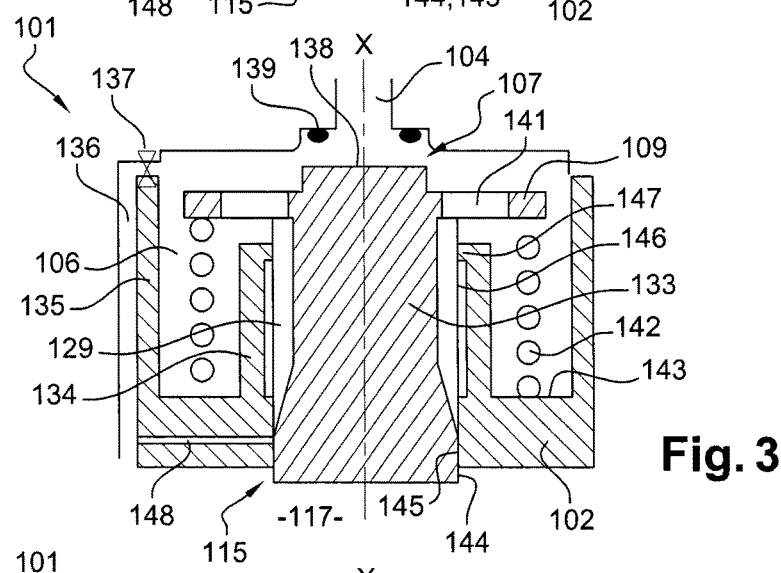
Figure 4:
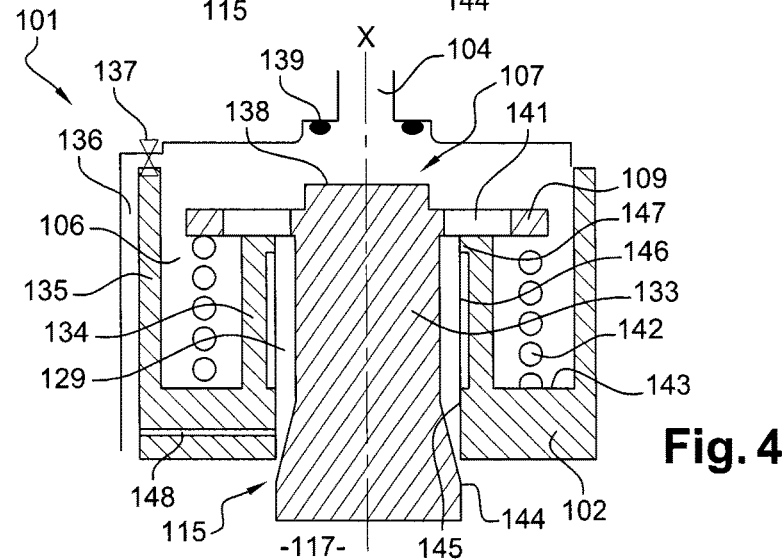

FIGS. 2 to 4 are diagrams showing a portion of an injector in an embodiment of the invention in which the injector 100 has a body 102 that comprises, as above, a pre-admission chamber 104 situated downstream from a filter or a strainer and upstream from a stop valve 107 formed by a first end (referred to below as a top end) of a movable member 133. The body 102 also has an admission chamber 106 defined radially between an inner tubular portion 134 and an outer tubular portion 135 of the body 102. A channel 136 forming part of a primary fuel circuit is arranged radially outside the annular portion 135, and its top end opens out into the admission chamber 106. A diaphragm 137 is situated level with the opening of the channel 136 of the primary circuit into the chamber 106.

The movable member 133 is mounted to slide along an axis X inside the inner tubular portion 134 of the body 102. The top end of the movable member 133 has a surface 138 perpendicular to the axis of said member 133 and forming the stop valve. Specifically, this surface 138 is for bearing in leaktight manner against an O-ring 139 housed in the end of a countersink formed in the body 102.

The movable member 133 also has a head 109 that is offset axially downwards relative to the first end 138, said head 109 having regularly distributed holes 141 passing therethrough.

A resilient member 142, e.g. such as a helical compression spring, is mounted in the chamber 106 and bears against the bottom face of the head 109 and against the bottom 143 of the chamber 106.

The bottom portion of the movable member 133 is in the form of a stem of axis X. Slots, referred to as "metering" slots 129, are formed in the outer surface of the bottom portion of the movable member 133, i.e. under the head 109. These slots 129 extend from the head 109 into a zone situated in the proximity of the second end or bottom end of the movable member 133, but offset from said bottom end. Thus, the movable member 133 has a sealing section 144 with a cylindrical outer surface that is situated between the bottom ends of the slots 129 and the bottom end of the movable member 133. The sealing section 144 of the movable member 133 co-operates with a sealing section 145 of complementary shape of the tubular portion 134 of the body 102 that is situated at the bottom end of said tubular portion 134 and that presents an inside surface that is cylindrical. In spite of there being a small amount of assembly clearance between said sealing sections 144, 145, the second end of the movable member 133 forms a metering valve 115 that can be considered as being in a closed position when the sealing section 144 of the movable member 133 is situated in the sealing section 145 of the body 102, and that is in an open position when the metering slots 129 open out beneath the sealing section 145 of the body 102 in a reception chamber 117 similar to that described above and connected to or forming part of a secondary fuel circuit.

The bottom ends of the slots 129 are of varying section. More particularly, the sections of the slots 129 decrease going towards the second end of the movable member 133.

The inner wall of the tubular portion 134 has a middle zone 146 of greater diameter, and two end zones 147, 145 of smaller diameter (including in particular the sealing zone 145), in order to form bearing surfaces for guiding the movable member 133. This serves to provide short guidance for the movable member 133 and also to provide better sealing in the sealing sections 144, 145 and to reduce friction between the movable member 133 and the tubular portion 134.

The body 102 also has a leakage channel 148 extending radially and opening out firstly into the sealing section 145 of the inner wall of the tubular portion 134 and secondly in the channel 136.

The pressures of fuel in the pre-admission chamber 104 that enable the stop and metering valves 107 and 115 to open are referenced P'1 and P'2 respectively. These pressures are functions in particular of the area of the surface 138, of the spring constant (written K) of the return spring 142 of the movable member 133, and of the stroke (written x) of the movable member 133.

In operation, when the pressure of the fuel upstream from the stop valve 107 is greater than the pressure P'1, the movable member 133 is in the position shown in FIG. 2 where sealing is provided at the stop valve 107 by the surface 138 bearing against the O-ring 139. It should be observed that the leakage flow rate past the stop valve 107 is very small or zero.

When the pressure is greater than P'1 and less than P'2, the movable member 133 is moved through a stroke x1 enabling the stop valve 107 to be opened while keeping the metering valve 115 closed, i.e. while maintaining at least a portion of the sealing section 144 of the movable member within the sealing section 145 of the body 102 (FIG. 3).

In this situation, the fuel from the pre-admission chamber 104 penetrates into the admission chamber 106, in particular through the holes 141, and then into the channel 136 so as to feed the primary fuel circuit. It should be observed that a small laminar leakage flow exists between the cylindrical surfaces of the sealing sections 144, 145, with a fraction of this leakage flow being reinjected into the primary circuit via the leakage channel 148. This is made possible by the existence of a small pressure difference between the two ends of the leakage channel 148. This pressure difference is generated in particular by the diaphragm 137.

Finally, when the pressure of the fuel is greater than P'2, the movable member 133 is moved through a stroke x2 so as to open both the stop valve 107 and the metering valve 115.

In this situation, fuel penetrates into the admission chamber 106 and is directed both towards the channel 136 and the primary circuit and also towards the chamber 117 and the secondary circuit, via the slots 129. The flow rate of fuel brought into the secondary circuit is a function of the flow section of the slots 129, i.e. of the position of the movable member 133. The further the movable member 133 is moved downwards, the greater this flow section (and thus the greater the flow rate of fuel in the secondary circuit). After moving through a certain distance, the head 109 of the movable member 133 comes into abutment against the top end of the tubular portion 134 of the body 102, as shown in FIG. 4. Movement of the movable member 133 is thus limited by this abutment.

The invention claimed is:

1. A fuel injector for a turbine engine, the fuel injector comprising:
   a body including a pre-admission chamber for admitting fuel under pressure;
   a stop valve mounted in the body downstream from the pre-admission chamber and designed to open at a first determined fuel pressure and to remain open beyond that first determined fuel pressure in order to feed a primary fuel circuit; and
   a metering valve mounted in the body downstream from the stop valve and designed to open above a second determined fuel pressure, greater than the first determined fuel pressure, and to remain open above the second determined fuel pressure in order to feed a secondary fuel circuit,
   wherein the stop valve and the metering valve form a common movable assembly, the stop valve being formed by a first free end of the movable assembly, the metering valve being formed by a second end of the movable assembly, wherein the stop valve is designed, in a closed position of said stop valve, to bear against a seat of the body, the seat fitted with an O-ring,
   wherein the body includes an inner tubular portion in the movable assembly is slidably mounted, an outer surface of the movable assembly including at least one slot having both a first end of the at least one slot opening out into an inner chamber of the body situated downstream from the stop valve and in fluid flow connection with the primary fuel circuit, and a second end of the at least one slot having a varying section, the second end of the at least one slot being spaced apart from the second end of the movable assembly by a sealing section of the movable assembly, in the sealing section of the movable assembly co-operates with a complementary sealing section of the inner tubular portion so as to form the metering valve,
   wherein the inner chamber of the body is defined between the inner tubular portion and an annular wall of the body located radially outside said inner tubular portion, a resilient return member being housed at least in part in said inner chamber of the body and bearing at a first end of the resilient return member against an abutment of the movable assembly, and at a second end of the resilient return member against a bottom of said inner chamber of the body,
   wherein the abutment of the movable assembly bears against the inner tubular portion of the body when the stop valve and the metering valve are open,
   wherein the abutment of the movable assembly is located between the first free end of the movable assembly and the second end of the movable assembly, the abutment of the movable assembly being closer to the first free end of the movable assembly than the second end of the movable assembly, and
   wherein the abutment includes holes.

2. The fuel injector according to claim 1, wherein said movable assembly is urged towards the closed position of the stop valve and of the metering valve with the resilient return member.

3. The fuel injector according to claim 1, wherein a leakage channel is formed in the body and opens out at a first end of the leakage channel in the sealing section of the inner tubular portion, and at a second end of the leakage channel in the primary fuel circuit.

4. A turbine engine, including at least one fuel injector according to claim 1.

* * * * *

UNITED STATES PATENT AND TRADEMARK OFFICE
CERTIFICATE OF CORRECTION

PATENT NO.        : 9,857,080 B2
APPLICATION NO.   : 14/506914
DATED             : January 2, 2018
INVENTOR(S)       : Christophe Chabaille et al.

Page 1 of 1

It is certified that error appears in the above-identified patent and that said Letters Patent is hereby corrected as shown below:

In the Claims

Column 8, Line 1, change "portion in the" to --portion in which the--; and

Column 8, Line 11, change "in the sealing section" to --in which the sealing section--.

Signed and Sealed this
Sixteenth Day of July, 2019

Andrei Iancu
*Director of the United States Patent and Trademark Office*